United States Patent [19]
Morival

[11] 3,846,357
[45] Nov. 5, 1974

[54] PROCESS FOR THE POLYMERIZATION OF LACTAMES ALLOWING SUBSTANCES AFFECTED BY HIGH TEMPERATURES TO BE ADDED DURING POLYMERIZATION

[75] Inventor: Geneviève Morival, Serquigny, France

[73] Assignee: Societe Anonyme dite: Aquitaine Total Organico Tour Aquitaine, Courbevoie, France

[22] Filed: Sept. 17, 1973

[21] Appl. No.: 397,840

Related U.S. Application Data

[63] Continuation of Ser. No. 191,474, Oct. 21, 1971, abandoned.

[52] U.S. Cl. ....... 260/18 N, 260/30.8 R, 260/37 M, 260/37 N, 260/78 A, 260/78 R
[51] Int. Cl. ..................... C08g 51/02, C08g 51/22
[58] Field of Search. 260/18 N, 78 L, 78 A, 30.8 R, 260/37 M, 37 n

[56] References Cited
UNITED STATES PATENTS

| | | | |
|---|---|---|---|
| 2,681,096 | 6/1954 | Semegen | 260/37 |
| 2,748,099 | 5/1956 | Bruner et al. | 260/37 |
| 3,052,646 | 9/1962 | Goggett | 260/18 |
| 3,239,490 | 3/1966 | Gee et al. | 260/78 |
| 3,240,732 | 3/1966 | Ham et al. | 260/78 |
| 3,410,832 | 11/1968 | Griehl et al. | 260/78 |
| 3,454,412 | 7/1969 | Stokes | 260/18 |
| 3,488,326 | 1/1970 | Van Beveren et al. | 260/78 |
| 3,491,042 | 1/1970 | Hermann et al. | 260/18 |
| 3,493,633 | 2/1970 | Lange | 260/857 |
| 3,554,980 | 1/1971 | Ando et al. | 260/18 |

FOREIGN PATENTS OR APPLICATIONS

| | | | |
|---|---|---|---|
| 561,702 | 6/1944 | Great Britain | 260/78 |
| 203,414 | 11/1954 | Australia | 260/78 |

*Primary Examiner*—Donald E. Czaja
*Assistant Examiner*—Eugene C. Rzucidlo

[57] ABSTRACT

The present invention concerns a process for the polymerization of lactams containing at least six carbon atoms in the ring, and preferably at least 10, offering a simple, economical method of obtaining polyamides with particular properties such as flexibility, capacity and resistance to ageing.

The invention relates to a process for polymerizing lactams in the presence of water, in which the lactam is first heated to temperatures of above 270°C, the temperature of the reaction mixture is then reduced to below 270°C, modifying agents affected by high temperature are then added, and finally transformation is completed at temperatures below 270°C.

The resulting polymers are specially suitable for the production of moulded articles, sheets, tubes and pipes offering flexibility, stability and resistance to ageing.

23 Claims, No Drawings

PROCESS FOR THE POLYMERIZATION OF LACTAMES ALLOWING SUBSTANCES AFFECTED BY HIGH TEMPERATURES TO BE ADDED DURING POLYMERIZATION

This is a continuation of application Ser. No. 191,474, filed Oct. 21, 1971, now abandoned.

The present invention concerns a process for the polymerization of lactams containing at least six carbon atoms in the ring, and preferably dodecalactam, resulting in polyamides with special properties, such as flexibility, opacity, colouring and resistance to ageing.

The properties of polyamides are frequently improved by the addition of substances such as plasticizers, pigments, colouring agents, metal powders, moulding or lubricating agents and anti-oxidizing agents. Under industrial conditions, such substances are added to the polymer by kneading and extrusion of the granules, but this increases the cost of the final product considerably. It also involves the purchase of equipment such as a mixer and extruder, and requires more labour and time.

To overcome these drawbacks, processes have been proposed which consist of adding substances to change the properties of the polyamides, at the beginning of the lactam polymerization operation. In the case of 12 polyamide or polydodecalactam, this is impracticable industrially, because of the high temperatures, of around 280° to 300°C, needed to allow the dodecalactam ring to be opened. At these very high temperatures, and in the presence of catalysts to facilitate opening of the ring, most of such substances are affected adversely: in the presence of phosphoric acid, for instance, and at temperatures of 280°C and above, titanium oxide is turned into titanium phosphate.

In the case of a 6 polyamide or polycaprolactam, polymerization can be carried out at much lower temperatures, around 240°C, and this allows such processes to be employed without the risk of adverse effects on modifying agents. However, it is often better to polymerize caprolactam at temperatures of above 270°C, and this means that the same reactions occur as with 12 polyamide.

The process according to the present invention in all cases allows polyamides with improved properties to be obtained without the need for expensive mixing operations after polymerization, and without any adverse effects on the modifying agents.

The present invention concerns a process for polymerizing lactams with at least six carbon atoms in the ring, in the presence of water, in which the lactam is first heated to temperatures of above 270°C, the reaction mixture temperature is then reduced to a temperature of below 270°C, the modifying agents affected by high temperatures are added, and finally the transformation is completed at temperatures below 270°C.

The process according to the invention is particularly recommended in the case of lactams with at least 10 carbon atoms in the ring.

The lactams used for this process include caprolactam, and preferably dodecalactam. Lactams with at least six carbon atoms in the ring can also be polymerized mixed with one another, or with other polyamide-producing monomers. For example, it is possible to polymerize mixtures of monomers containing at least 50 percent moles of dodecalactam with other monomers, including lactams such as undecalactam, capryllactam, oenantholactam and caprolactam, amino-acids such as amino-undecanoic acid and amino-caproic acid, and diacid and diamine salts such as diamine hexamethylene adipate, diamine hexamethylene sebacate, and dilinoleic acid salt with diamine dimer.

The first stage of polymerization takes place at temperatures of between 270° and 335°C, and preferably between 280° and 320°C. When the temperature drops below 280°C, the speed of polymerization slows down increasingly, and can become too slow for industrial purposes. Above 320°C, the reaction is brought very close to the zone in which the polyamide decomposes, which happens around 335°C, without any significant corresponding increase in the speed of polymerization. The length of the first stage can vary considerably, depending on the temperature of polymerization, and the type and concentration of the catalysts used, but it should be long enough to ensure that the lactam cycles are almost totally opened, so that the mixture is in the form of oligomers or polymers of low molecular weight.

When the first stage of polymerization is completed, the temperature is reduced to below 270°C, to a level which obviously depends on the substances to be added and on their resistance to heat, notably in the presence of the catalyst being used, but which should preferably be between 260° and 180°C.

Finally, polymerization is completed at temperatures below 270°C. The temperatures may be much lower than for the first stage, since even in the case of lactams with at least 10 carbon atoms in the ring, where polymerization has to be begun at high temperatures in order to open the ring which is much more stable than for caprolactam or capryllactam for instance, it is not necessary to continue operating at such a high temperature once the rings have been opened. The completion temperature will depend mainly on the resistance to heat of the substances added, in the presence of the catalysts being used. It will usually be below 260°C, and preferably between 250° and 200°C. However, polymerization may also be completed at temperatures below the melting point of the polyamide (180°C in the case of 12 polyamide), between 175° and 130°C, for example.

The polymerization process according to the invention takes place in the presence of water and catalysts. The catalysts that may be used include inorganic acids such as phosphoric acic, boric acid, hypophosphorous acid, organic acids such as acetic, propionic, caproic, caprylic, lauric, stearic, adipic and sebacic acids, and organic bases such as hexamethylenediamine. Preference should be given, however, to ortho-phosphoric acid, hypophosphorous acid and ortho-boric acid, on their own or mixed with monocarboxylic acids such as acetic acid. The amount of catalyst is usually between 0.05 and 2 percent of the weight of the mixture for polymerization, and more frequently between 0.1 and 0.5 percent.

The substances affected by high temperatures that may be added during this process are plasticizers, pigments, colouring agents, fillers, matting agents, powdered metals, moulding or lubricating agents, light and heat stabilizing agents, fireproofing agents, agents to improve adherence. Plasticizers include ethyl para-oxybenzoate and aryl sulphonamides such as toluene sulphonamide, toluene ethylsulphonamide, butylbenzene sulphonamide and cyclohexyl para-toluene sulphonamide. Colouring agents and pigments include titanium oxide, cadmium yellows and reds, phthalocyanine blues and greens. Fireproofing agents are generally compounds of antimony, phosphorous and halogens. Stabilizing agents include reducing inorganic ions such as the ions provided by manganese, copper or tin phosphites, aromatic amines such as naphthylamine and paraphenylene diamine, phosphonic esters and substances derived from phenol, benzotriazole and benzophenone. Mould-removal or lubricating agents include alkylphenol etheroxy products, fatty acid derivatives, polyethylene glycol and its derivatives, and metal stearates.

These substances are preferably added in liquid form, in other words in their natural form if they are already liquid, in molten form if their melting point is fairly low, or in the form of a suspension in a liquid.

The process according to the invention may be carried out at high pressure, normal pressure or even in a vacuum. It is advisable to carry out the first stage under pressure, and reduced pressure as the reaction is completed, in an inert gas atmosphere such as nitrogen or carbon dioxide. The second stage of the process may also be performed in a vacuum, so as to remove the water vapour that forms more quickly.

The process may be performed continuously or intermittently in existing lactam polymerization apparatuses, such as tubes allowing simple continuous reaction, or in autoclaves with or without stirring devices.

In one embodiment of the invention, the first stage of polymerization is performed in one autoclave, and the temperature of the polymer is then lowered by removing it to a second autoclave, at a lower temperature, through a pipe which is also at a lower temperature. Reduction of the temperature of the polymer inside the first autoclave is obviously not advisable in industrial operation, since it would take too much time.

Under industrial conditions, the process may be carried out as follows. The lactam rings are opened and it is converted into oligomers and polymers of low molecular weight, in the first autoclave, at high temperature (around 300°C) and in an inert atmosphere. When this reaction is almost completed, the temperature of the low-viscosity polymer is lowered by passing it along a pipe, which is at a high enough temperature to prevent the polymer from solidifying, into a second autoclave, which is at a temperature 50° to 80°C lower than that of the first, and which contains an inert gas. Polymerization is continued at this temperature. Then, using a recipient fitted on to the second autoclave, the substances to be included in the final product are added. If they are liquid, they are added in their natural form; if not, they are formed into a suspension in a liquid, or melted first, if the melting point is low enough. Polymerization is continued, and the polymer is extruded as soon as the required viscosity is reached. This can be estimated by the reading recorded for the power of the stirring shaft in the autoclave.

The polymers obtained by means of the process according to the invention are suitable for use in cases requiring polyamides, particularly where they must be flexible, stable and resistant to ageing.

Such polymers can easily be used to produce moulded articles, sheets, tubes and pipes, by injection, blowing or extrusion. They can also be used to make powders for coatings.

The invention is illustrated by, without being in any way confined to, the following examples.

EXAMPLE 1

Preparation of flexible 12 polyamide.

8 kg of dodecalactam, 240 cc of distilled water and 12 g of phosphoric acid are placed in a 30-litre autoclave, which is then closed, the air being removed by three successive drainings with nitrogen. It is then heated to 300°C over 2 hours, the pressure then reached being 10 kg. It is kept at this temperature and pressure for 3 hours, after which the pressure is partly released. The dodecalactam is approximately 95.5 percent converted into polymer of low molecular weight. This low-viscosity polymer is moved from the first autoclave to a second, along a pipe at a temperature of 220° to 230°C. The second autoclave, which contains nitrogen, is heated to a temperature of 210° to 220°C. When it has been moved to the second autoclave, the temperature of the polymer is reduced to 265°C. Pressure continues to be released until atmospheric pressure is reached, and the temperature is simultaneously lowered to approximately 250°C. 1.2 kg of liquid plasticizer (sulphamide) are then added, through a recipient connected to the second autoclave by a small pipe and valve. Polymerization is continued for about 2 hours, until the right viscosity is obtained. This is shown by the reading for the power of the stirring shaft in the second autoclave. The polymer is extruded into water, to cool it, and granulated.

EXAMPLE 2

Preparation of white 12 polyamide for spinning.

10 kg of dodecalactam, 300 cc of distilled water, and 15 g of phosphoric acid are placed in a 30-litre autoclave, which is then closed, the air being removed by three successive drainings with nitrogen. It is then heated to 300°C over 2 hours, the pressure reached being 10 to 12 kg. It is kept at this temperature and pressure for 3 hours, after which the pressure is partly released. The dodecalactam is almost completely converted into polymer of low molecular weight. This polymer is moved from the first autoclave to a second, along a pipe at a temperature of 230°C. The second autoclave is at a temperature of approximately 220°C. After passing into the second autoclave, the temperature of the polymer is 265°C. Pressure continues to be released until atmospheric pressure is reached, and the temperature is simultaneously reduced to 250°C. 40 g of titanium oxide are added, in suspension in 100 g of melted stearic acid in the recipient on top of the autoclave. Polymerization is continued for a further 2 hours, until the right viscosity is obtained. This is shown by the power of the stirring shaft. The polymer is extruded into water, to cool it, and granulated.

What is claimed is:

1. A process for the polymerization of polyamides which consists essentially of polymerizing in the presence of water, a lactam having at least 6 carbon atoms in the ring and in the presence of an acidic catalyst or organic base catalyst, at a temperature between 270°C and 335°C, cooling the reaction mixture to a temperature between 260°C and 130°C, adding to said cooled reaction mixture a member selected from the group consisting of stabilizers, plasticizers, pigments, coloring agents, metal powders, molding agents, lubricating agents and anti-oxidizing agents, and completing the polymerization reaction at a temperature of 260°C to 130°C.

2. A polymerization process according to claim 1, in which the lactam polymerized has at least 10 carbon atoms in the ring.

3. A polymerization process according to claim 2, in which the lactam is dodecalactam.

4. A polymerization process according to claim 2, in which the lactam is undecalactam.

5. A polymerization process according to claim 1, in which the lactam is caprolactam.

6. A polymerization process according to claim 3, in which the dodecalactam is copolymerized with another lactam.

7. A polymerization process according to claim 6, in which the dodecalactam is copolymerized with undecalactam.

8. A polymerization process according to claim 6, in which the dodecalactam is copolymerized with caprolactam.

9. A polymerization process according to claim 3, in which the dodecalactam is copolymerized with an amino-acid.

10. A polymerization process according to claim 9, in which the dodecalactam is copolymerized with amino-undecanoic acid.

11. A polymerization process according to claim 3, in which the dodecalactam is copolymerized with di-acid salts with diamines.

12. A polymerization process according to claim 11, in which the dodecalactam is copolymerized with hexamethylene diamine adipate.

13. A polymerization process according to claim 11, in which the dodecalactam is copolymerized with a linoleic acid salt with diamine dimer.

14. A polymerization process according to claim 1, in which the plasticizer is an aryl sulphonamide.

15. A polymerization process according to claim 1, in which the pigment is titanium oxide.

16. A polymerization process according to claim 1, in which said acid catalyst is an inorganic acid.

17. A polymerization process according to claim 16, in which the inorganic acid is a phosphoric acid.

18. A polymerization process according to claim 17, in which the inorganic acid is orthophosphoric acid.

19. A polymerization process according to claim 16, in which the inorganic acid is hypophosphorous acid.

20. A polymerization process according to claim 1, in which said acid catalyst is an organic acid.

21. A polymerization process according to claim 1, in which the catalyst is an organic base.

22. A polymerization process according to claim 3, in which the dodecalactam is copolymerized with a substance selected from the group consisting of undecalactam, caprolactam, amino undecanoic acid, hexamethylene diamine adipate and a linoleic acid salt with diamine dimer.

23. A polymerization process according to claim 3, in which the dodecalactam is polymerized in a first autoclave at temperatures of between 280° and 300°C, the oligomerized dodecalactam is then moved to a second autoclave, the temperature of which is 50° to 80°C lower than the aforesaid temperature, adding said additive in liquid form, and completing the polymerization at the temperature of the second autoclave.

* * * * *

UNITED STATES PATENT OFFICE
CERTIFICATE OF CORRECTION

Patent No. 3,846,357    Dated November 5, 1974

Inventor(s) GENEVIEVE MORIVAL

It is certified that error appears in the above-identified patent and that said Letters Patent are hereby corrected as shown below:

Convention Priority for this patent, based on French Patent Application No. 7038555, filed October 26, 1970, should be shown in the Title.

In the Abstract, the word "capacity" should be corrected to read -- opacity --.

Signed and sealed this 11th day of February 1975.

(SEAL)
Attest:

RUTH C. MASON
Attesting Officer

C. MARSHALL DANN
Commissioner of Patents
and Trademarks